United States Patent
Baccay

(10) Patent No.: US 8,265,247 B2
(45) Date of Patent: Sep. 11, 2012

(54) METHOD OF PROVIDING MESSAGE INFORMATION, INCLUDING CALL SUBJECT INFORMATION, TO A RECIPIENT OF A TELEPHONE CALL

(75) Inventor: Peter Baccay, Redwood City, CA (US)

(73) Assignee: Research In Motion Limited, Waterloo (CA)

( * ) Notice: Subject to any disclaimer, the term of this patent is extended or adjusted under 35 U.S.C. 154(b) by 869 days.

(21) Appl. No.: 12/393,077

(22) Filed: Feb. 26, 2009

(65) Prior Publication Data

US 2010/0215161 A1 Aug. 26, 2010

(51) Int. Cl.
*H04M 1/56* (2006.01)
*H04M 15/06* (2006.01)

(52) U.S. Cl. ............... 379/142.04; 379/142.17; 379/245

(58) Field of Classification Search ............... 379/88.19, 379/88.21, 93.17, 93.23, 142.01, 142.04, 379/142.06, 142.09, 142.12, 142.15, 142.17, 379/245; 455/414.1, 414.4, 415
See application file for complete search history.

(56) References Cited

U.S. PATENT DOCUMENTS

| | | | |
|---|---|---|---|
| 6,434,528 B1 * | 8/2002 | Sanders | 704/275 |
| 6,741,689 B2 | 5/2004 | Burg | |
| 6,768,792 B2 * | 7/2004 | Brown et al. | 379/207.14 |
| 6,842,512 B2 * | 1/2005 | Pedersen | 379/142.01 |
| 6,888,927 B1 * | 5/2005 | Cruickshank et al. | 379/88.11 |
| 7,215,750 B2 | 5/2007 | Nguyen et al. | |
| 7,274,781 B2 * | 9/2007 | Lipton et al. | 379/142.01 |
| 7,280,464 B1 * | 10/2007 | Newhouse et al. | 370/203 |
| 7,280,646 B2 * | 10/2007 | Urban et al. | 379/142.01 |
| 7,283,625 B2 * | 10/2007 | Urban et al. | 379/142.04 |
| 8,085,756 B2 * | 12/2011 | Sun et al. | 370/352 |
| 2004/0208301 A1 | 10/2004 | Urban et al. | |
| 2007/0297587 A1 * | 12/2007 | Urban et al. | 379/142.17 |

FOREIGN PATENT DOCUMENTS

| EP | 0 802 661 A2 | 10/1997 |
|---|---|---|
| EP | 1 988 696 A1 | 11/2008 |

* cited by examiner

*Primary Examiner* — Binh Tieu

(57) ABSTRACT

A methodology wherein a voice service client application on one or more phones and a voice service server perform a call set-up process through a mix of an external data channel and a normal voice channel that enables call subject information to be effectively provided by a calling party to a called party so that it can be displayed along with other caller ID information.

25 Claims, 6 Drawing Sheets

US 8,265,247 B2

METHOD OF PROVIDING MESSAGE INFORMATION, INCLUDING CALL SUBJECT INFORMATION, TO A RECIPIENT OF A TELEPHONE CALL

BACKGROUND

1. Field

The disclosed and claimed concept relates generally to telephony systems and, more particularly, to a method of providing message information, including information relating to the subject of a telephone call, to the recipient of the telephone call.

2. Background Information

As is known, traditional telephony systems implement circuit-switched voice telephone communications technology. Such telephony systems include traditional land line systems that utilize the public switched telephone network (PSTN), and cellular (wireless) systems which implement circuit-switched voice telephone communications via cellular radio channels employing an air interface involving radio frequency (RF) communications and using one or more networks of land based radio transmitters or base stations, commonly referred to as a public land mobile network (PLMN), which interconnect with other PLMNs and the PSTN. In such systems (both land line and cellular), it is known to employ a caller identification service (commonly referred to as caller identification (caller ID or CID) or calling number identification (CNID)). Caller ID is a telephone service that transmits a caller's number to the called party's telephone equipment during the ringing signal, or when the call is being set up but before the call is answered. Where available, caller ID can also provide a name associated with the calling telephone number. The information made available to the called party is typically made visible on the display of the called party's telephone. While the caller's name and telephone number may be useful to the called party, it would also be useful if information relating to the subject of the call could also be effectively provided. Such information would, for example, aid the called party in determining whether to answer the call. Thus, there is a need for a method for effectively providing call subject information to a called party in a telephony system.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

Figure 1:
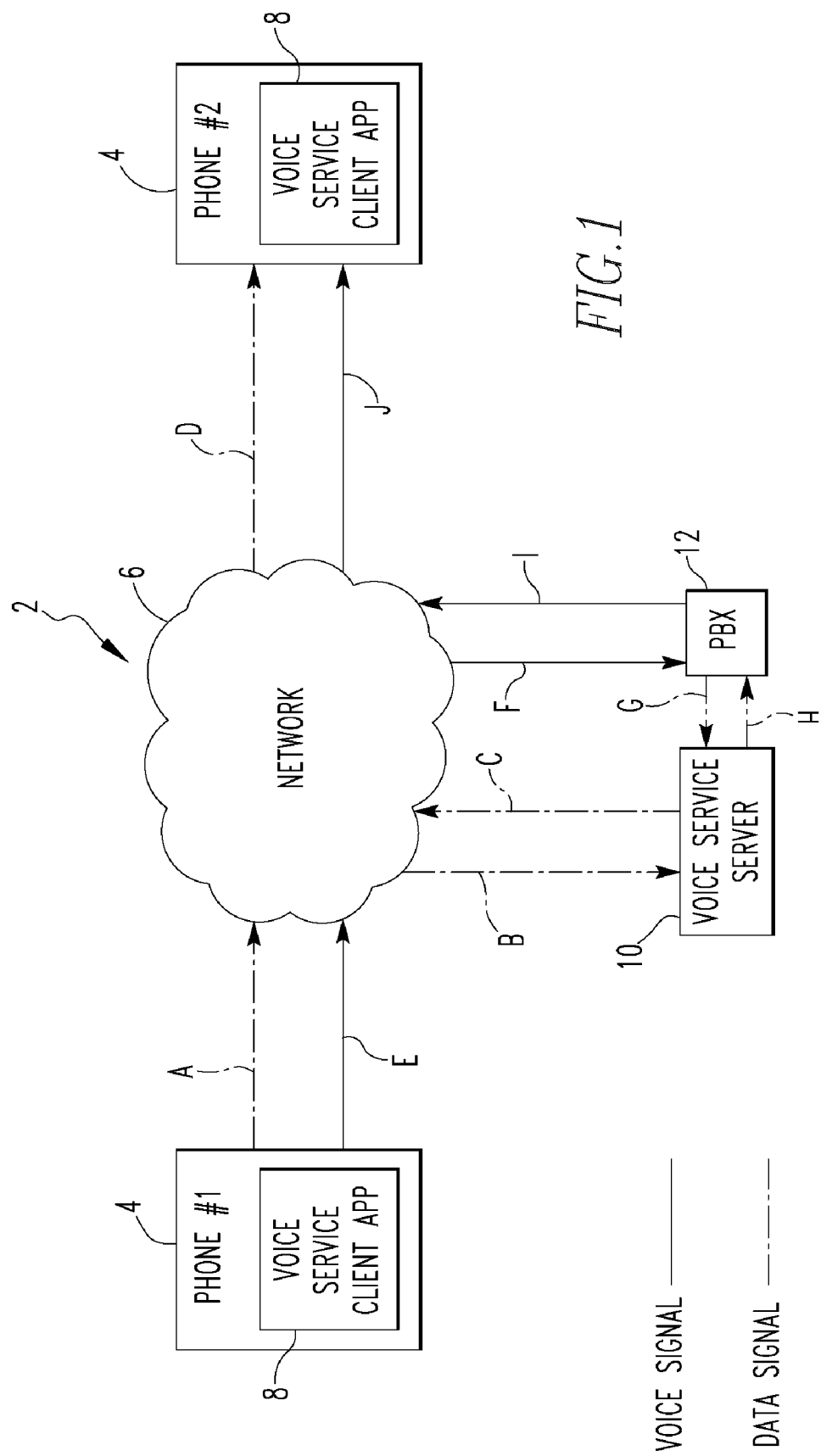
FIG. 1 is a block diagram of a telephony system which provides call subject information to a called party according to one particular, non-limiting embodiment of the disclosed and claimed concept.

FIG. 1 is a block diagram of a telephony system 2 which provides call subject information to a called party according to one particular, non-limiting embodiment of the disclosed and claimed concept. As described in detail elsewhere herein, the solid lines in FIG. 1 represent voice signals carried on a voice channel, and the dashed lines in FIG. 1 represent data signals carried on a data channel. The telephony system 2 includes first and second phones 4, identified as Phone #1 and Phone #2. Each phone 4 may be a land line telephone or a wireless telephone, such as a known cellular phone or another handheld electronic device having wireless telephone functionality (e.g., a so-called smartphone). Each phone 4 is operatively coupled to a network 6 which is capable of transmitting both voice and data signals as described elsewhere herein. In one particular, non-limiting embodiment, each of the phones 4 is a wireless phone and the network 6 is a cellular network as described elsewhere herein which includes one or more PLMNs coupled to the PSTN. As will be appreciated, other combinations are possible within the scope of the disclosed and claimed concept. In addition, each phone 4 has a voice service client application 8 resident thereon that is executable by the phone 4 (the processor thereof) and which provides the functionality described in detail elsewhere herein. For purposes of illustrating the disclosed and claimed concept, in the examples provided herein, phone 4 identified as Phone #1 is the calling party and phone 4 identified as Phone #2 is the called party. It should be understood, however, that the roles of such phones 4 may be reversed. It should be understood that additional phones 4 may be included in the telephony system 2, such as in a conference call situation where one of the phones 4 is the calling party initiating the conference call and two or more of the other phones 4 are the called parties.

As seen in FIG. 1, the telephony system 2 also includes a voice service server 10 that is operatively coupled to the network 6. The voice service server 10 is preferably a computing apparatus (e.g., a server computer or computers) having and executing a voice service server application which provides the functionality described in detail elsewhere herein. In addition, the telephony system 2 further includes a private branch exchange (PBX) 12, or some other suitable network node such as a network gateway, that is operatively coupled to the network 6.

Figure 2A:
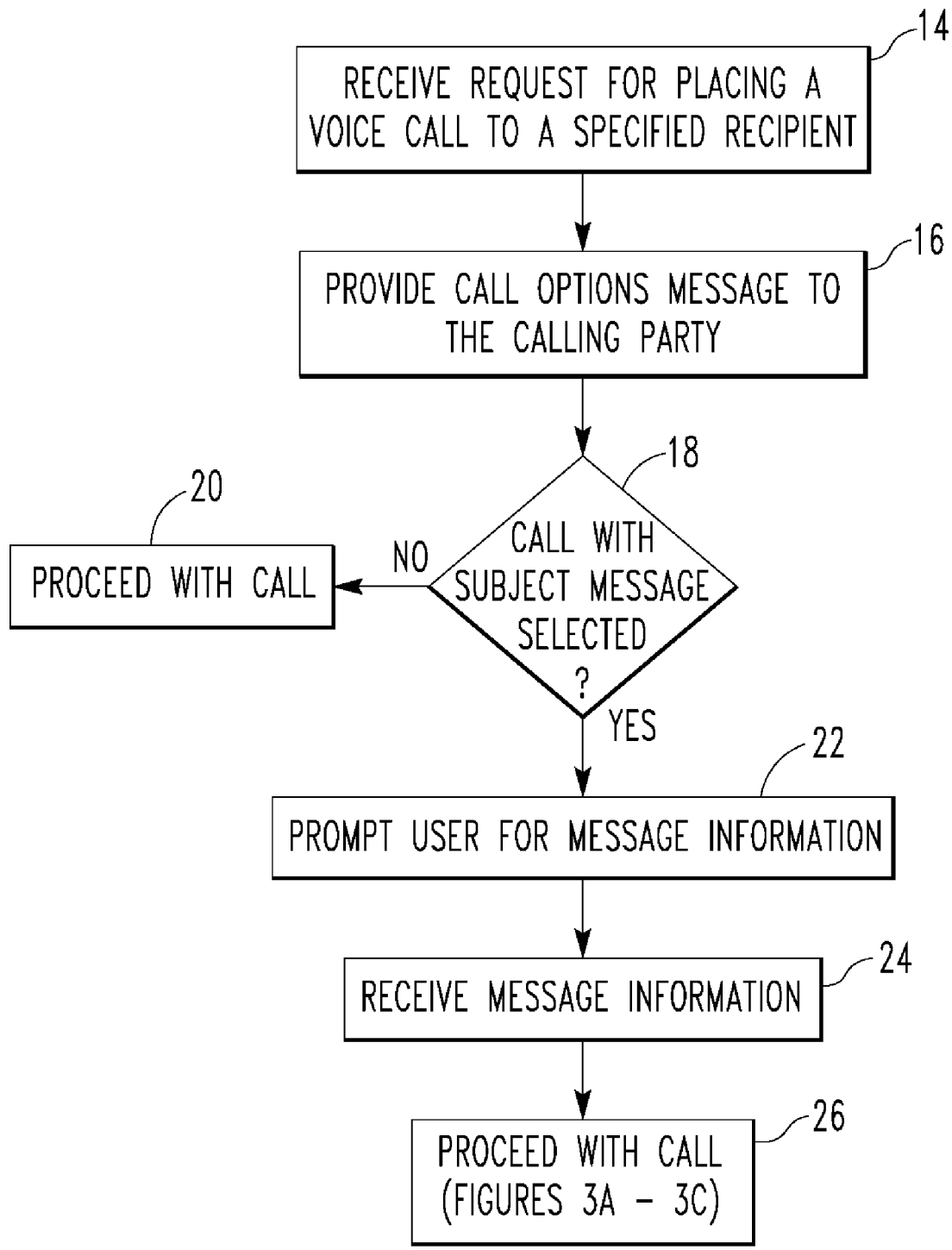
FIG. 2A is a flowchart showing a method for enabling the calling party to elect whether to include call subject information when a call is placed according to one particular, non-limiting embodiment of the disclosed and claimed concept.
Figure 2B:
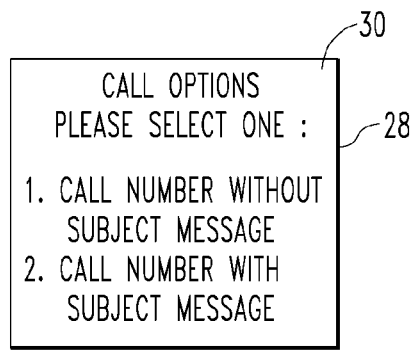
FIGS. 2B through 2E are exemplary display screens that may be employed in the method of FIG. 2A.
Figure 2C:
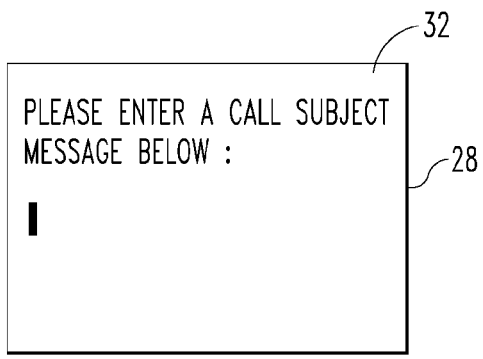
Figure 2D:
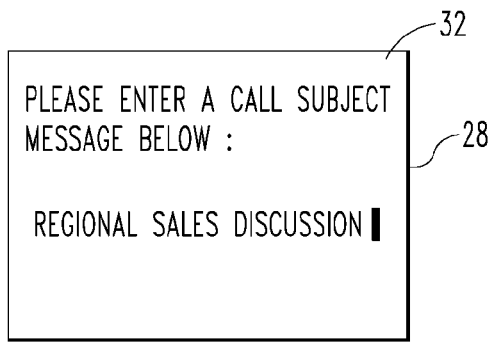
Figure 2E:
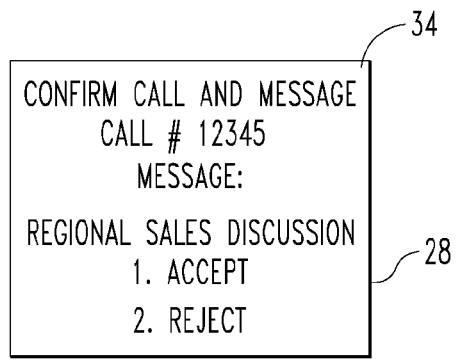

According to an aspect of the disclosed concept, the calling party using phone 4 identified as Phone #1 is, prior to actually initiating a call to a desired number, able to elect whether to (i) simply place the call to the desired number, or (ii) place the call to the desired number (the phone 4 identified as Phone #2 of the called party in the example being used herein) with a call subject message being provided therewith in accordance with the disclosed and claimed concept. FIG. 2A is a flowchart showing one, non-limiting method for enabling the calling party to make such an election which is preferably implemented by the voice service client application 8. The method begins at step 14, wherein the voice service client application 8 of the phone 4 identified as Phone #1 receives a request from the calling party (through appropriate input using an input mechanism such as a keypad or touchscreen provided as part of phone 4) for placing a voice call to a specified recipient (e.g., a specified phone number or a contact selected from an address book of the phone 4), namely the called party using phone 4 identified as Phone #2 in the present example. At step 16, the phone 4 identified as Phone #1 provides a call options message to the calling party which asks the calling party whether he or she would like to place the requested call with a call subject message. FIG. 2B shows a display 28 of the phone 4 having a screen 30 provided thereon for implementing such a call options message according to one particular, non-limiting embodiment. As seen in screen 30, the calling party is able to select the option he or she prefers. At step 18, a determination is made as to whether the call with subject message option has been selected. If the answer is no, then, at step 20, the call can be placed using known methods. If, however, the answer at step 18 is yes, then, at step 20, the phone 4 identified as Phone #1 prompts the user to enter the desired message information. FIG. 2C shows the display 28 having a screen 32 provided thereon for implementing such a prompt according to one particular, non-limiting embodiment. Next, at step 24, the phone 4 identified as Phone #1 receives the desired message information. FIG. 2D shows the screen 32 after the calling party has entered the desired message information (using an input mechanism such as a keypad or touchscreen provided as part of phone 4). Then, at step 26, the phone 4 identified as Phone #1 proceeds with the call in the manner described below in connection with FIGS. 3A-3C. FIG. 2E shows the display 28 having a screen 34 provided thereon for implementing a confirmation of the call with the desired message information according to one example embodiment.

Figure 3A:
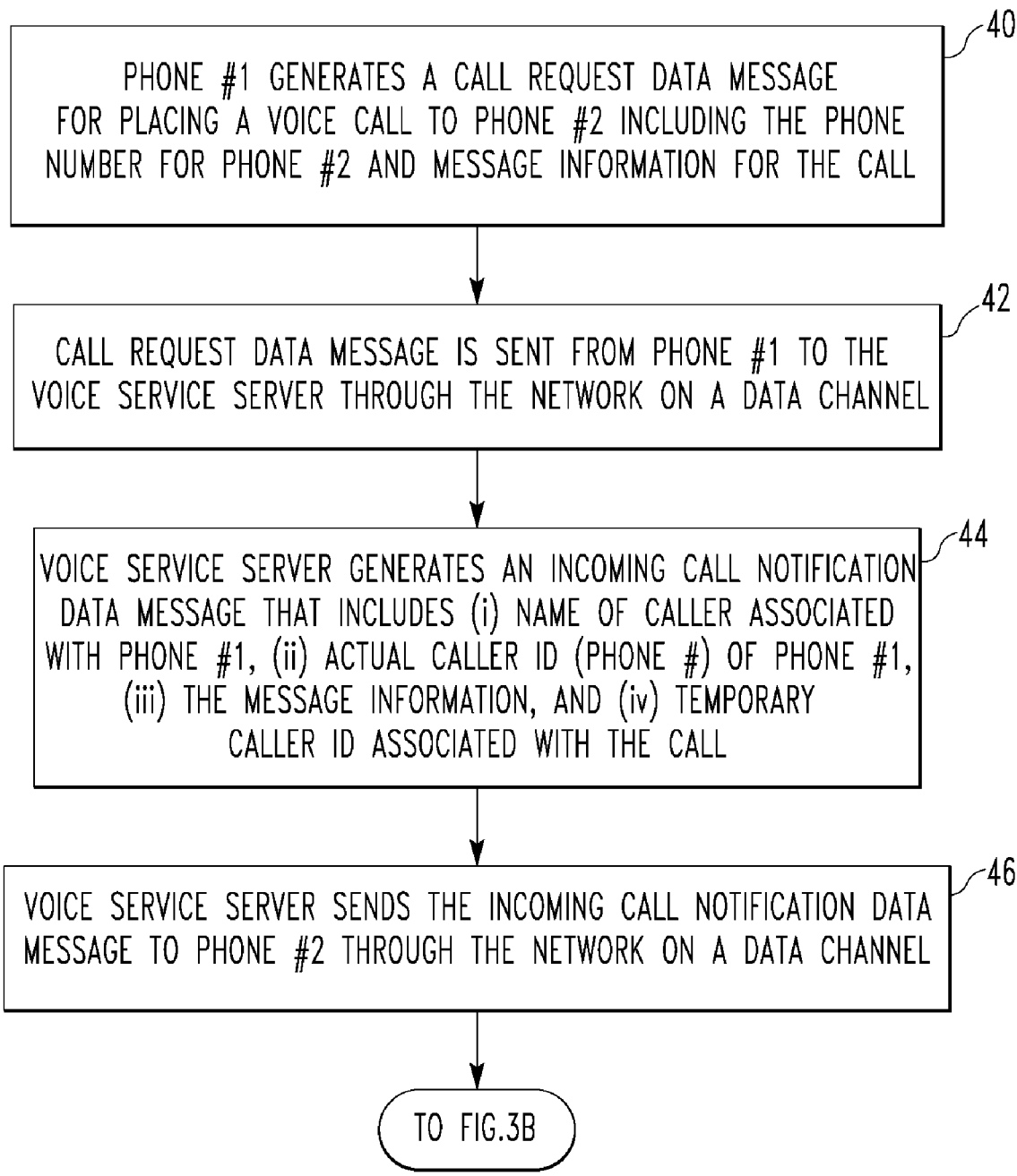
FIGS. 3A through 3C are a flowchart of a method of providing call subject information to a called party in the telephony system of FIG. 1 according to one particular embodiment.
Figure 3B:
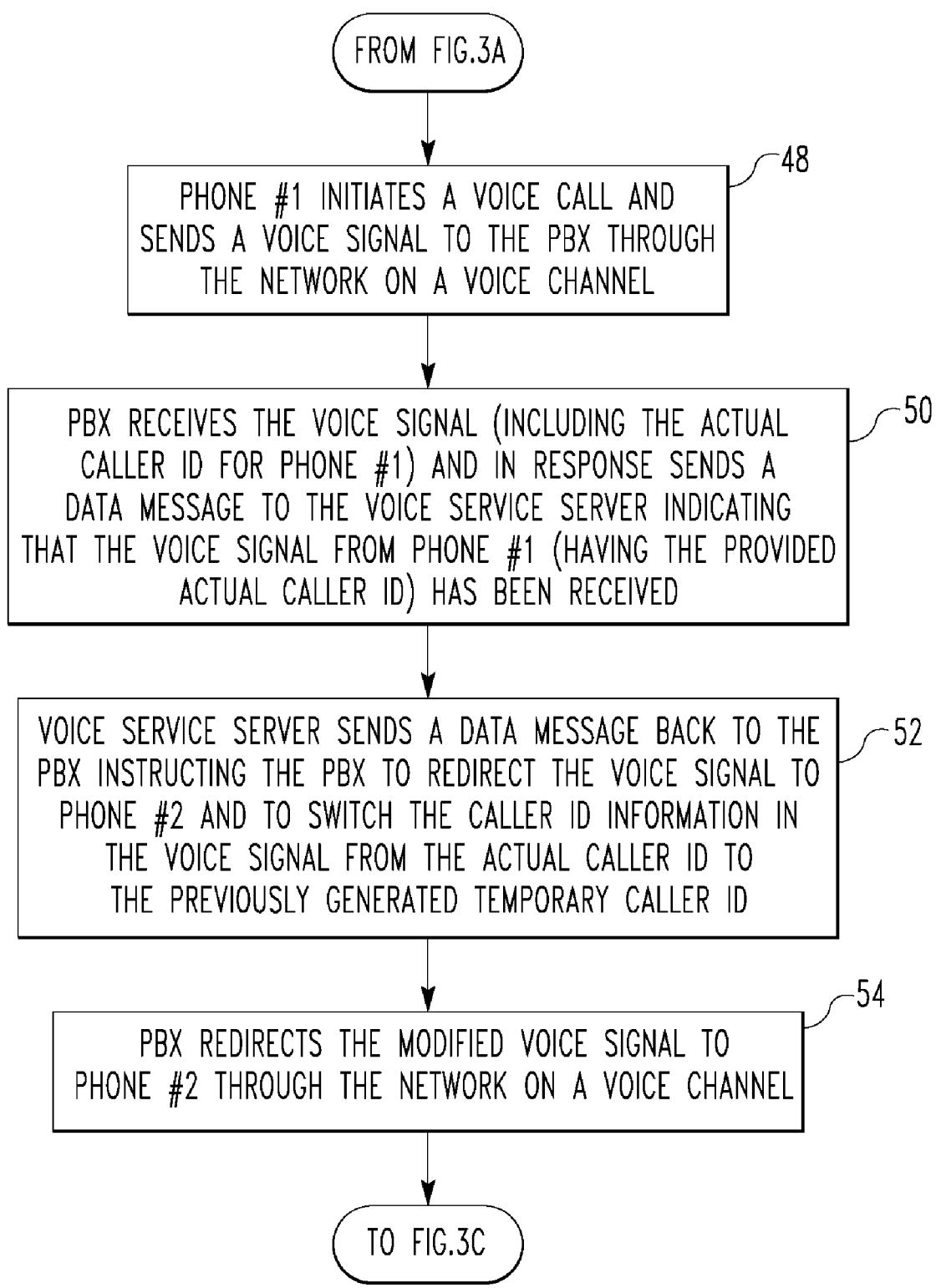
Figure 3C:
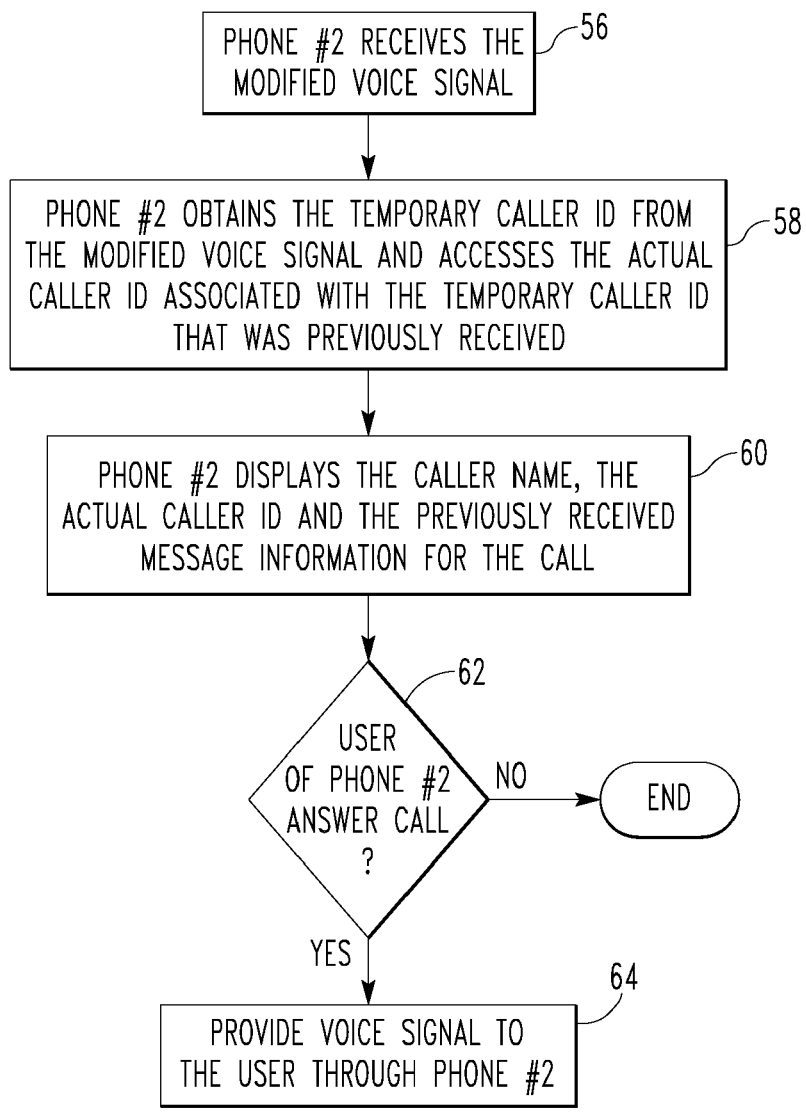

FIGS. 3A-3C are a flowchart of a method of providing call subject information to a called party in the telephony system 2 according to one particular embodiment. Again, for purposes of illustration, in the description associated with FIGS. 3A-3C, phone 4 identified as Phone #1 is the calling party and phone 4 identified as Phone #2 is the called party. It should be understood, however, that the roles of such phones 4 may be reversed, and/or that additional phones 4 may be included in the telephony system 2. The method of FIGS. 3A-3C assumes that the calling party has made an election to place a call to a desired number (the phone 4 identified as Phone #2 of the called party in the example being used herein) with a call subject message being provided therewith based on, for example, the method shown in FIG. 2.

Referring to FIG. 3A, the method begins at step 40, wherein Phone 4 identified as Phone #1 generates a call request data message for placing a voice call to Phone 4 identified as Phone #2 which includes (i) the phone number for Phone 4 identified as Phone #2 and (ii) the desired message information for the call which, for example, identifies the subject or purpose for the call. At step 42, the call request data message is sent from Phone 4 identified as Phone #1 to the voice service server 10 through the network 6 on a data channel. The communication of step 42 is shown in FIG. 1 by the dashed lines identified by the letters A and B. Next, at step 44, the voice service server 10 generates an incoming call notification data message that includes the following information: (i) the name of the caller associated with Phone 4 identified as Phone #1, i.e., the calling party, (ii) the actual caller ID (i.e., the phone number) of the Phone 4 identified as Phone #1, (iii) the message information that was provided by the calling party, and (iv) a temporary caller ID for Phone 4 identified as Phone #1 (for this particular call) that is generated by the voice service server 10. For illustrative purposes in the present example, the actual caller ID for the Phone 4 identified as Phone #1 will be 12345 and the temporary caller ID for the Phone 4 identified as Phone #1 will be 11111.

At step 46, the voice service server 10 sends the incoming call notification data message generated in step 44 to Phone 4 identified as Phone #2 through the network 6 on a data channel. This data communication is represented by the dashed lines C and D in FIG. 1. Thus, following step 46, the Phone 4 identified as Phone #2 (the called party) will, based on the incoming call notification data message it has received, know that it will be receiving a voice call imminently and that that voice call will have associated with it the temporary caller ID generated by the voice service server 10. The Phone 4 identified as Phone #2 will store the data of the incoming call notification data message until used as described herein.

Referring to FIG. 3B, the method then proceeds to step 48, wherein the Phone 4 identified as Phone #1 initiates a voice call and sends a voice signal to the PBX 12 through the network 6 on a voice channel. This communication is indicated by the solid voice signal lines E and F of FIG. 1. At step 50, the PBX 12 receives the voice signal (including the actual caller ID for Phone 4 identified as Phone #1), and in response sends a data message to the voice service server 10 indicating that the voice signal from Phone 4 identified as Phone #1 (having the provided actual caller ID) has been received. This data signal is indicated by the dashed line G of FIG. 1. At step 52, the voice service server 10 sends a data message back to the PBX 12 instructing the PBX 12 to redirect the voice signal to the Phone 4 identified as Phone #2 and to switch the caller ID information in the voice signal from the actual caller ID (originally included therewith) to the previously generated temporary caller ID. This data signal is indicated by the dashed line H of FIG. 1. At step 54, the PBX 12, in response to the data message received from the voice service server 10, redirects the modified voice signal to Phone 4 identified as Phone #2 through the network 6 on a voice channel. This voice communication is indicated by the solid lines I and J of FIG. 1.

Referring now to FIG. 3C, the method then proceeds to step 56, wherein the Phone 4 identified as Phone #2 (the called party) receives the modified voice signal from the PBX 12. Next, at step 58, the voice service client application 8 of the Phone 4 identified as Phone #2 obtains the temporary caller ID from the modified voice signal and accesses the stored actual caller ID that is associated with the temporary caller ID that was previously received (in the incoming call notification data message) along with the other data of the associated incoming call notification data message (caller name and message information). At step 60, the Phone 4 identified as Phone #2 displays the caller name, the actual caller ID and the previously received message information for the call. Thus, the temporary caller ID is used as password for the voice service client application 8 to connect the call with the incoming call notification data message it received just prior to the phone call. So in essence the incoming call notification data message includes call information (subject, name, true phone number/actual caller ID) and a password (temporary caller ID). If a phone call that doesn't contain the password lands on Phone #2 after the incoming call notification data message is processed by the voice service client application 8 of Phone #2, Phone #2 will not connect the information in the incoming call notification data message with that phone call. In an alternative embodiment, the use of the temporary caller ID is be omitted. In this embodiment, the incoming call notification data message will only have the actual caller ID and not the temporary caller ID, and the voice signal sent to the Phone 4 identified as Phone #2 will have the actual caller ID and not the temporary caller ID (i.e., the switch of step 52 is not performed). In such a case, the actual caller ID acts as the password.

Figure 4:
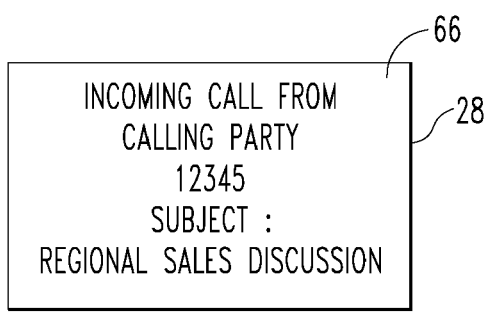
FIG. 4 shows an exemplary display screen which displays call subject information in accordance with one particular, non-limiting embodiment of the disclosed and claimed concept.

FIG. 4 shows the display 28 of Phone 4 identified as Phone #2 which includes a screen 66 displaying the information as specified in step 60 according to one particular, non-limiting embodiment. Next, at step 62, a determination is made in Phone 4 identified as Phone #2 as to whether the user thereof (the called party) answers the call. If the answer is no, then the method ends. If, however, the answer is yes, then Phone 4 identified as Phone #2 provides the voice signal for the call to the user. In one particular, non-limiting embodiment, the call log of Phone 4 identified as Phone #2 will store all of the information that was displayed in step 60. Thus, if the called party reviews the call log for prior calls (either missed or received), the called party will be able to associate a subject with the call that was implemented in accordance with FIGS. 3A through 3C, or any other call generated by that process.

Thus, the telephony system 2 shown in FIG. 1 and the methods shown in FIG. 2 and FIGS. 3A through 3C provide a methodology wherein the voice service client application 8 on each Phone 4 and the voice service server 10 perform a call set-up process through a mix of an external data channel and a normal voice channel that enables call subject information to be effectively provided by a calling party to a called party so that it can be displayed along with other caller ID information.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A telephony method, comprising:
    generating a first data message on a first phone, said first data message relating to a voice call to be placed from said first phone to a second phone and including message information relating to said voice call, said message information being provided by a user of said first phone;
    receiving said first data message from said first phone in a server over a first data channel;
    in response to receiving said first data message, generating a second data message in said server, said second data message including first caller ID information relating to said first phone and said message information;
    sending said second data message to said second phone over a second data channel;
    receiving over a voice channel in said second phone a voice signal originating from said first phone, said voice signal including second caller ID information; and
    in response to receiving said voice signal, outputting said message information from said second phone.

2. The telephony method according to claim 1, wherein said first caller ID information comprises an actual caller ID for said first phone and a temporary caller ID generated by said server, wherein said second caller ID information comprises said temporary caller ID, and wherein said second caller ID information is used in said second phone to access said message information.

3. The telephony method according to claim 1, wherein said first caller ID information comprises an actual caller ID for said first phone and wherein in response to receiving said voice signal, said method further includes outputting said actual caller ID from said second phone.

4. The telephony method according to claim 3, wherein said second data message includes a name associated with said first phone and wherein in response to receiving said voice signal, said method further includes outputting said name from said second phone.

5. The telephony method according to claim 1, wherein said outputting said message information from said second phone comprises visually displaying said message information on said second phone.

6. The telephony method according to claim 2, further comprising generating said voice signal in said first phone and sending said voice signal to a network node over a second voice channel, said voice signal when generated in said first phone including said actual caller ID, wherein said network node substitutes said temporary caller ID for said actual caller ID in said voice signal and sends said voice signal to said second phone over said voice channel.

7. The telephony method according to claim 6, wherein said network node comprises a PBX.

8. The telephony method according to claim 6, wherein said network node comprises a gateway.

9. The telephony method according to claim 6, wherein said network node in response to receiving said voice signal sends a third data message to said server and in response receives a fourth data message from said server, said fourth data message instructing said network node to substitute said temporary caller ID for said actual caller ID in said voice signal and to send said voice signal to said second phone over said voice channel.

10. The telephony method according to claim 1, wherein said first caller ID information and said second caller ID information each comprises an actual caller ID for said first phone.

11. The telephony method according to claim 1, wherein said message information relates to a subject of said voice call.

12. The telephony method according to claim 1, further comprising receiving said message information in said first phone in response to said user of said first phone entering said message information into said first phone using an input device of said first phone.

13. A telephony method, comprising:
    receiving a first data message from a first phone over a first data channel, said first data message relating to a voice call to be placed from said first phone to a second phone and including message information relating to said voice call, said message information being provided by a user of said first phone;
    in response to receiving said first data message, generating a second data message, said second data message including first caller ID information relating to said first phone and said message information;
    sending said second data message to said second phone over a second data channel; and
    providing a voice signal originating from said first phone to said second phone over a voice channel, said voice signal including second caller ID information, said voice signal causing said second phone to output said message information.

14. The telephony method according to claim 13, further comprising generating a temporary caller ID for said first phone, wherein said first caller ID information comprises an actual caller ID for said first phone and said temporary caller ID, wherein said second caller ID information comprises said temporary caller ID, and wherein said second caller ID information is used in said second phone to access said message information.

15. The telephony method according to claim 13, wherein said causing said second phone to output said message information comprises visually displaying said message information on said second phone.

16. The telephony method according to claim 14, said voice signal when received from said first phone including said actual caller ID, said method further comprising substituting said temporary caller ID for said actual caller ID in said voice signal prior to sending said voice signal to said second phone over said voice channel.

17. The telephony method according to claim 13, wherein said first caller ID information and said second caller ID information each comprises an actual caller ID for said first phone.

18. The telephony method according to claim 13, wherein said message information relates to a subject of said voice call.

19. The telephony method according to claim 13, further comprising receiving said message information in said first phone in response to said user of said first phone entering said message information into said first phone using an input device of said first phone.

20. A telephony system, comprising:
a server adapted to be coupled to a network, said server being adapted to: (i) receive a first data message from a first phone over a first data channel, said first data message relating to a voice call to be placed from said first phone to a second phone and including message information relating to said voice call, said message information being provided by a user of said first phone, (ii) in response to receiving said first data message, generate a second data message, said second data message including first caller ID information relating to said first phone and said message information, (iii) send said second data message to said second phone over a second data channel; and (iv) cause a voice signal originating from said first phone to be provided to said second phone over a voice channel, wherein said voice signal includes second caller ID information, said voice signal causing said second phone to output said message information.

21. The telephony system according to claim 20, said server being further adapted to generate a temporary caller ID for said first phone, wherein said first caller ID information comprises an actual caller ID for said first phone and said temporary caller ID, wherein said second caller ID information comprises said temporary caller ID, and wherein said second caller ID information is used in said second phone to access said message information.

22. The telephony system according to claim 21, said voice signal when received from said first phone including said actual caller ID, said server being further adapted to cause said temporary caller ID to be substituted for said actual caller ID in said voice signal prior to said voice signal being provided to said second phone over said voice channel.

23. The telephony system according to claim 20, wherein said first caller ID information and said second caller ID information each comprises an actual caller ID for said first phone.

24. The telephony system according to claim 20, wherein said message information relates to a subject of said voice call.

25. The telephony system according to claim 20, wherein said message information is provided by a user of said first phone in response to said user of said first phone entering said message information into said first phone using an input device of said first phone.

* * * * *